Jan. 8, 1957     H. M. SMITH     2,776,908
METHOD OF PRODUCING MONOLAYER ELECTRODE SCREENS
Filed June 6, 1955
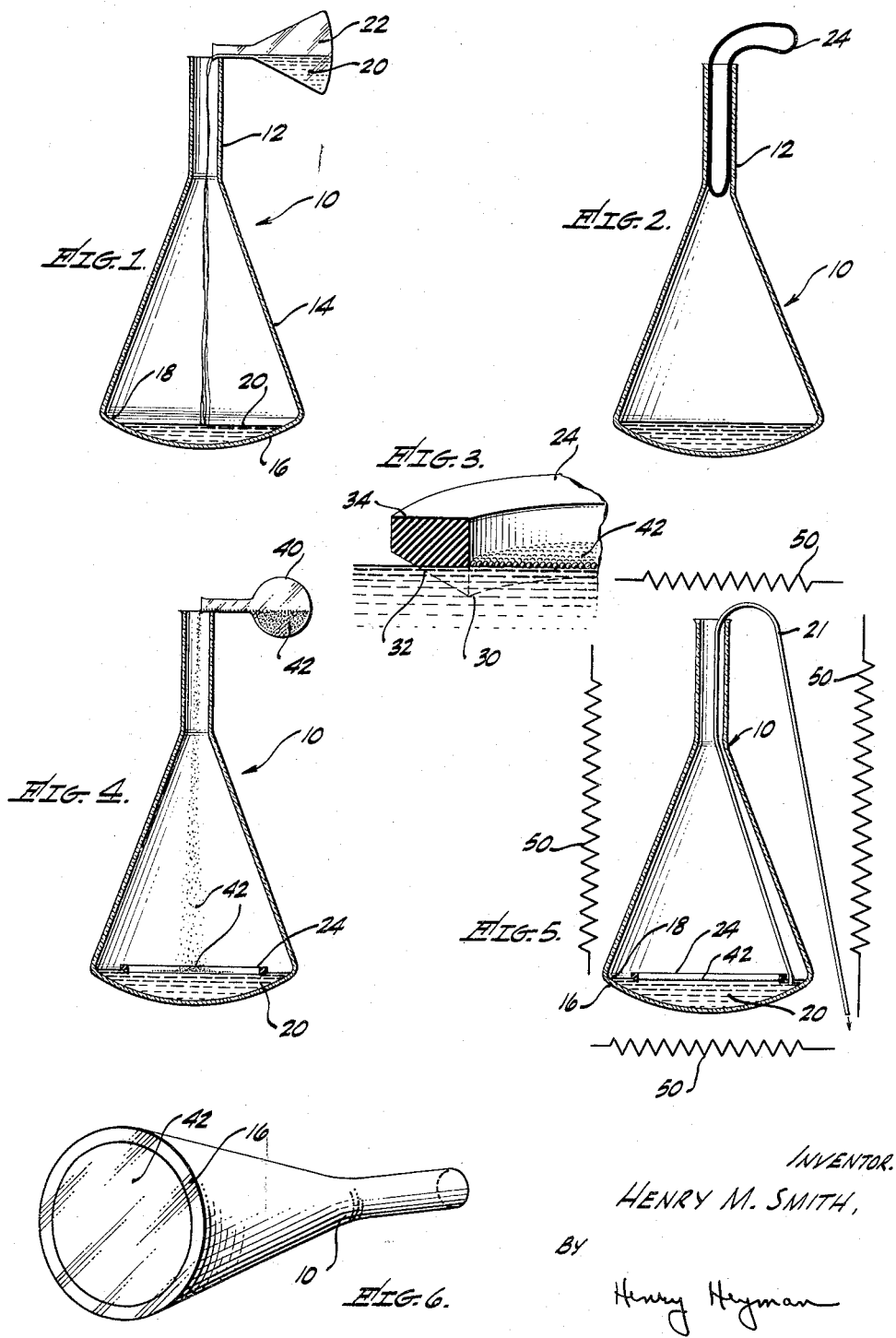
INVENTOR.
HENRY M. SMITH,
BY
Henry Heyman
ATTORNEY.

United States Patent Office 2,776,908
Patented Jan. 8, 1957

2,776,908

METHOD OF PRODUCING MONOLAYER ELECTRODE SCREENS

Henry M. Smith, Pacific Palisades, Calif., assignor to Hughes Aircraft Company, Culver City, Calif., a corporation of Delaware Application June 6, 1955, Serial No. 513,222

9 Claims. (Cl. 117—33.5)

This invention relates to the art of making very thin electrode screens, and more particularly to an improvement in the process of depositing a monothin layer of a material such as a luminescent phosphor over a relatively flat and smooth surface by floating minute particles of the luminescent material over that surface on a liquid carrier and then removing the liquid carrier from the surface.

Heretofore when such a depositing process was employed to form a thin phosphor layer, for example, on the viewing wall of the glass envelope of the cathode-ray type electron tube, it was inherently difficult to distribute the phosphor particles uniformly over the surface to be coated. When the liquid carrier was removed, the particles of phosphor would tend to compact in greater concentration in the areas of the surface to which they first came in contact. For example, if the envelope had an outwardly convex viewing end, the phosphor particles at the outer radial limits of the surface would be deposited more thickly than at the central portion of the surface.

Others in the field have attempted to form a uniform monolayer screen by using a compacting cylinder. According to that method, a thin walled cylinder is placed on the surface to be coated and filled with a liquid carrier covering the surface to be coated and then phosphor particles are spread on the liquid carrier. The particles are added to the carrier surface until a uniform monolayer of the particles are spread over the surface of the carrier. Then the carrier is removed and the particles move toward and coat the surface. However, as a practical matter, it is inherently difficult to prevent the phosphor particles from attaching themselves to the compacting cylinder itself. A non-uniform particle distribution thus develops which is little better than that which is produced without the use of the compacting cylinder.

It is therefore an object of the invention to provide a method of producing a uniform monolayer electrode screen on a relatively flat and smooth surface.

It is another object of the invention to provide an improved method of depositing a fluorescent phosphor layer as on the viewing end of a cathode-ray type electron tube envelope.

Briefly, in accordance with this invention, these objects are achieved in the following manner: Assuming, as an example, that the interior of the viewing end of a cathode-ray type electron tube envelope is to be coated, an annular shaped solid made of an elastic material, as for example a rubber O ring, is placed on the surface to be coated and a liquid carrier is added upon which the O ring floats. Then phosphor particles are dusted onto the portion of the liquid surface bounded by the O ring until the desired monolayer is spread over the carrier surface. The phosphor particles are thus kept compacted while the liquid carrier is removed as by siphoning, and a uniform compacted monolayer is deposited on the surface to be coated. The phosphor particles then have substantially no tendency to attach themselves to the rubber ring because the ring floats down with the phosphor particles as the carrier is removed. Instead of an O ring, a gas-filled elastic membrane or a foam rubber ring may be employed.

The novel features which are believed to be characteristic of the invention, both as to its organization and method of operation, together with further objects and advantages thereof, will be better understood from the following description considered in connection with the accompanying drawing in which an example of the process of the invention is illustrated. It is to be expressly understood, however, that the drawing is for the purpose of illustration and description only, and is not intended as a definition of the limits of the invention.

Figs. 1 and 2 illustrate two steps in the process according to the present invention;

Fig. 3 shows a cross-section of the O ring shown in Fig. 2;

Figs. 4 and 5 illustrate further steps of the invention; and

Fig. 6 is a perspective view of the surface of the envelope shown in the other figures on which a layer of phosphor has been deposited.

Referring to the drawing, and more particularly to Fig. 1, an upright cathode-ray tube envelope 10 is shown with an end wall 16 having an internal surface 18 which is to be coated with material such as, for example, a luminescent phosphor. A liquid carrier 20 is shown being poured into the envelope 10 from beaker 22. Any suitable liquid carrier may be used inasmuch as the only function of the liquid carrier 20 is to separate the minute phosphor particles on its surface. The particular carrier chosen may depend upon the particular phosphor being used or other circumstances. Pure distilled water is often a suitable carrier; and to this may be added a binder such as will coat the minute particles so that at a later step in the process, they may be secured to each other and to the surface to be covered. An example of such a binder is made by adding .01 percent of sodium silicate to a distilled water base. The amount of "water glass" so added is not critical, but to much will decrease the surface tension to the point where the particles will not float.

The liquid carrier 20 is poured into envelope 10 until substantially all the internal surface 18 is covered.

The second step, according to this example, comprises passing an annular solid 24 which, as above stated, may be a rubber O ring through the neck portion of envelope 10. The principal requirement of the annular solid 24, beyond being elastic for passage into the tube in this example, is that it have an average density substantially less than the density of the liquid carrier 20 to assure a high floating level in order to minimize the deleterious effect mentioned above of the compacting cylinder.

In order to further prevent the phosphor particles from attaching themselves to the inner surface of ring 24, the ring may have a cross-section as illustrated in Fig. 3. As shown in that figure, a ridge 30 indicates the line contact which may be made between the ring and the internal surface 18 which is to be coated. The ring may have a bottom surface 32 disposed at an angle with respect to the surface 18 which is somewhat greater than zero. Fig. 4 shows the further step in accordance with the invention. A beaker 40 is shown which contains the minute particles of fluorescent phosphor which are being poured into the envelope 10 onto the surface of the carrier 20 bounded by the O ring 24. Enough of the phosphor particles 42 are poured to provide a uniform compact surface over the liquid carrier within the ring. The phosphor particles 42 may consist of the selected compound desired to be coated. To assure that the particles 42 will float and be hydrophobic, they may be treated with a suitable silicone emulsion, many of which are well known in the art.

Fig. 5 shows an example of the step according to the invention of removing substantially all of liquid carrier 20 by means of siphon 21. When this has been done the remainder of liquid carrier 20 may be removed by evaporation leaving a dry monolayer film coating of phosphor on the surface 18 of envelope 10 within O ring 24. Four resistive elements 50 are shown externally to the envelope 10 to schematically indicate that envelope 10 may be heated in a furnace. Heating the envelope serves to "bake" the phosphor particles 42 by means of the added binder such as "water glass" onto the internal surface 18 of the envelope 16. A representative temperature may be 350° C.

Fig. 6 illustrates the end product of a cathode-ray tube envelope 10 having a monolayer thin phosphor screen 42 uniformly deposited on the viewing end 16 of the envelope.

The method and technique of the present invention may obviously be extended to deposit materials other than the phosphors on surfaces other than the viewing end of a cathode-ray tube. For example, the storage electrode in an electronic storage tube may be formed by the method of this invention.

What is claimed is:

1. The method of depositing a layer of pulverulent material on a relatively flat and smooth surface, said method comprising the steps of: covering the flat and smooth surface with a liquid carrier; depositing an elastic ring on the surface of said liquid carrier, said ring having an average density substantially less than the density of said liquid carrier; and disseminating particles of the pulverulent material over the portion of the surface of said liquid carrier bounded by said elastic ring, whereby said particles may be uniformly and compactly deposited on said flat and smooth surface.

2. The method of depositing a layer of a luminescent material on a relatively flat and smooth surface, said method comprising the steps of: covering the flat and smooth surface with a liquid carrier; depositing an elastic ring on the surface of said liquid carrier, said ring having an average density substantially less than the density of said liquid carrier; disseminating phosphor particles over the portion of the surface of said liquid carrier bounded by said elastic ring; and removing said liquid carrier from said flat and smooth surface, whereby said particles may be uniformly and compactly deposited on said flat and smooth surface.

3. The method of depositing a layer of a luminescent material on a relatively flat surface, said method comprising the steps of: covering said flat surface with a liquid carrier; depositing an elastic ring on the surface of said liquid carrier, said ring having an average density substantially less than the density of said liquid carrier; disseminating phosphor particles over the portion of the surface of said liquid carrier bounded by said elastic ring, removing said liquid carrier and said elastic ring from said flat surface; and baking said phosphor particles in a furnace, whereby said particles may be uniformly and compactly deposited on said flat surface.

4. The method of depositing a layer of a luminescent material on a relatively flat polished surface, said method comprising the steps of: covering said polished surface with a liquid carrier; depositing an elastic ring on the surface of said liquid carrier, said ring having an average density substantially less than the density of said liquid carrier; disseminating phosphor particles over the portion of the surface of said liquid carrier bounded by said elastic ring; evaporating said liquid carrier off of said polished surface; removing said elastic ring from said polished surface; and baking said phosphor particles onto said polished surface, whereby said particles may be uniformly and compactly deposited on said polished surface.

5. The method of depositing a fluorescent screen on the viewing end of a cathode-ray type electron tube envelope, said method comprising the steps of: covering the internal surface of the viewing end of said envelope with distilled water; depositing a rubber ring on the surface of said water; disseminating phosphor particles over the portion of the surface of said water bounded by said rubber ring; removing the water off of the internal surface of said viewing end of said envelope; removing said rubber ring from said envelope; and baking said envelope and said phosphor particles in a furnace.

6. The method of depositing a fluorescent screen on the viewing end of a cathode-ray type electron tube envelope, said method comprising the steps of: covering the internal surface of said viewing end of said envelope with a .01 percent solution of $Na_2SiO_3$; depositing an annular, gas-filled elastic membrane on the surface of said solution; disseminating phosphor particles over the portion of the surface of said solution bounded by said elastic membrane; siphoning said solution off of the internal surface of said viewing end of said envelope; removing said elastic membrane from said envelope; and baking said envelope and said phosphor particles in a furnace.

7. The method of depositing a layer of a luminescent material on a relatively flat polished surface, said method comprising the steps of: covering said polished surface with a liquid carrier, depositing an elastic ring on the surface of said liquid carrier, said ring having an average density substantially less than the density of said liquid carrier, disseminating phosphor particles over the portion of the surface of said liquid carrier bounded by said elastic ring, and heating said liquid carrier to evaporate said liquid carrier and to bond said phosphor particles to said polished surface, whereby said particles may be uniformly and compactly deposited over said polished surface.

8. The method of depositing a fluorescent screen on the viewing end of a cathode-ray type electron tube envelope, said method comprising the steps of: covering the internal surface of the viewing end of said envelope with distilled water, depositing an annular, gas-filled elastic membrane on the surface of said water, disseminating phosphor particles over the portion of the surface of said water bounded by said annular, gas-filled elastic membrane, draining the water off of the internal surface of said viewing end of said envelope, removing said elastic membrance from said envelope, and baking said envelope and said phosphor particles in a furnace at about 350° C.

9. The method of depositing a fluorescent screen on the viewing end of a cathode-ray tpye electron tube envelope, said method comprising the steps of: covering the internal surface of said viewing end of said envelope with a .01 percent solution of $Na_2SiO_3$, depositing a foam rubber ring on the surface of said solution, disseminating phosphor particles over the portion of the surface of said solution bounded by said foam rubber ring, and removing said solution from the internal surface of said veiwing end of said envelope.

No references cited.